Sept. 8, 1959 J. H. FERGUSON ET AL 2,902,865
ELECTRO MECHANICAL ACTUATOR
Filed April 18, 1955 2 Sheets-Sheet 1

INVENTORS
JOHN H. FERGUSON
BERNARD WASDYKE
BY Nicholas J. Garofalo
ATTORNEY

Sept. 8, 1959  J. H. FERGUSON ET AL  2,902,865
ELECTRO MECHANICAL ACTUATOR
Filed April 18, 1955  2 Sheets-Sheet 2
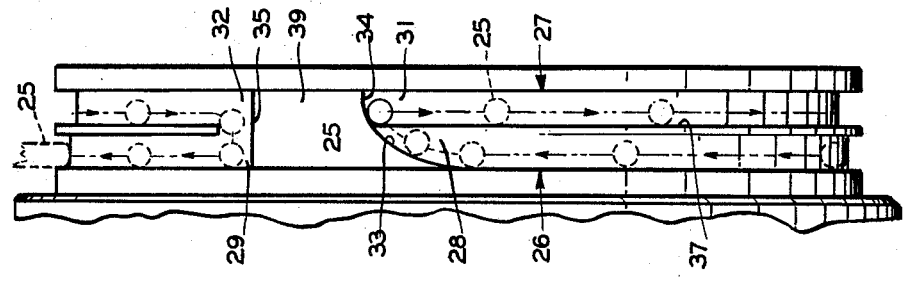
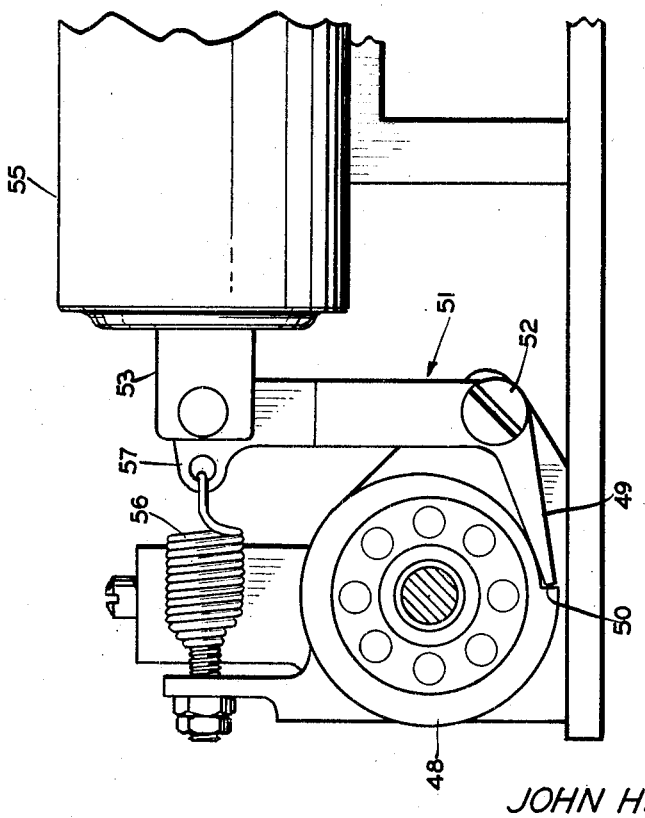
INVENTORS
JOHN H. FERGUSON
BERNARD WASDYKE
BY Nicholas J. Garofalo
ATTORNEY

United States Patent Office 2,902,865
Patented Sept. 8, 1959

2,902,865

ELECTRO MECHANICAL ACTUATOR

John H. Ferguson, Hillsdale, and Bernard T. Wasdyke, Little Falls, N.J., assignors to Bendix Aviation Corporation, Teterboro, N.J., a corporation of Delaware Application April 18, 1955, Serial No. 502,052

4 Claims. (Cl. 74—25)

This invention pertains to a novel electro-mechanical actuator or control device, the general purpose of which is to drive connected mechanism first in one direction and subsequently in a reverse direction, and to do so in a practical and efficient manner. The invention finds use in a wide variety of applications as a means of controlling the functions of an associated device.

In general, the invention concerns an electro-mechanical device wherein an output shaft is adapted to be driven through slightly less than one revolution by means of a motor and cam clutch and is adapted to be restored to normal position by means of suitable return means. As the shaft restores to normal position, it is once more engaged through the cam clutch with the motor drive for further cycling by the latter. The invention further includes various controls whereby the output shaft may be continuously cycled in an alternate manner, or, as desired, may be cycled first in one direction, held in its cycled position for a desired period of time, and then returned to normal position.

A feature of the invention lies in a double track cam clutch element and associated cooperating elements, through the action of which the output shaft is enabled to be turned in a practical and efficient manner first in one direction and then in the other.

Another feature of the invention is provided by solenoid operated holding means whereby the output shaft upon executing a cycle in one direction is caused to be locked against return, and may, as desired, be released and automatically returned.

An advantage of the invention, flowing from its various features and particular construction, is its versatility or adaptability to execute a plurality of desirable functions to control any of a number of devices with which it may be associated.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 2 is a side elevational view thereof; and

Fig. 3 is a plan view of the double track cam laid out flat so as to better illustrate this element.

Figure 1:
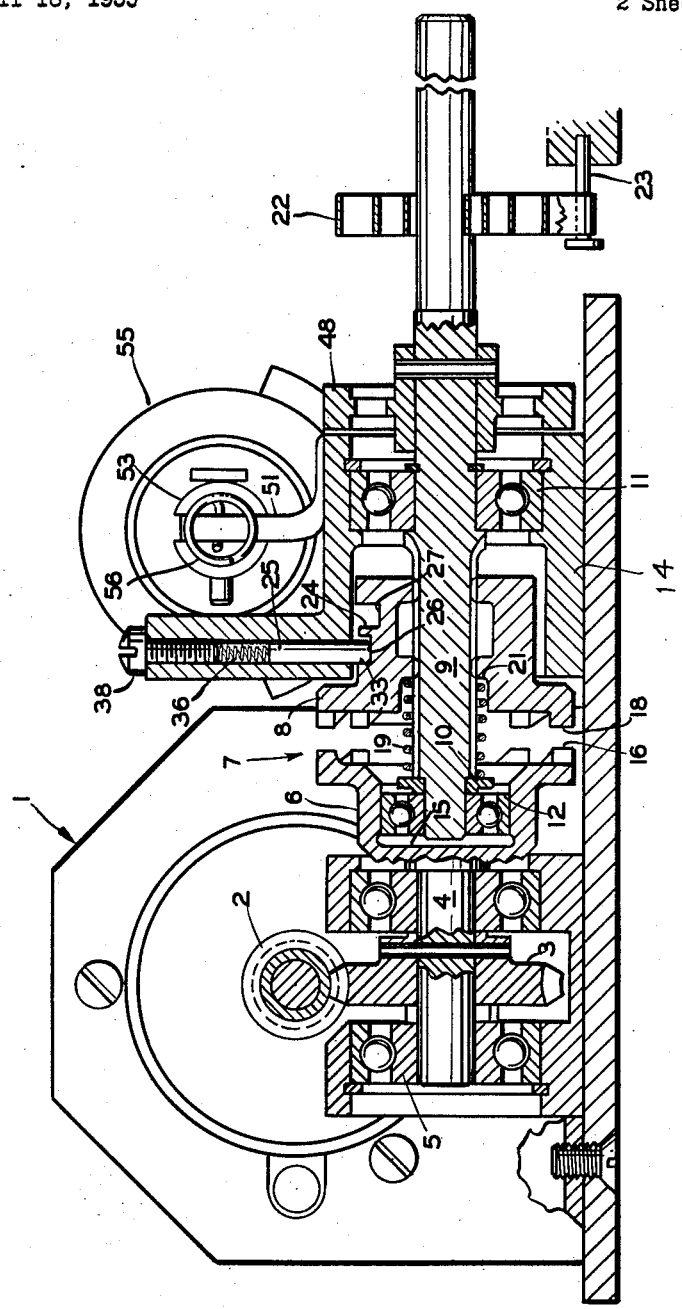
Fig. 1 is a longitudinal vertical section thereof.

Reference is directed to the drawings in further detailing the nature of the invention, wherein there is disclosed an electro-mechanical control device or actuator including a motor 1 geared, as by a worm gear 2 and a worm pinion 3, to a drive shaft 4 that is mounted for rotation in housed bearings 5. Carried at the end of the drive shaft is the driving half 6 of a clutch member, generally designated 7. The other or driven half 8 of the latter is slidably splined on an end of an output shaft 9. Shaft 9 is supported for rotation in suitably supported bearings 11 and 12. Bearing 11 is supported in the housing 14 of the device; bearing 12 is contained in a recess or cup 15 axially of clutch half 6.

Clutch half 6 provides a jaw face 16 engageable with an opposed complementary jaw face 18 of clutch half 8. A coil spring 19 about output shaft 9, confined between the two clutch halves, limits at one end against a stop 10 that abuts against the end wall of bearing 12, and limits at the other end against a shoulder 21 recessed in clutch member 8. Spring 9 continually urges clutch half 8 in a direction out of engagement from clutch member 6. A torsion spring 22 is connected at one end to the output shaft 9 about which it is wound, and is connected at the other to a support 23 of the housing. When torsion spring 22 unwinds, it turns the output shaft and clutch half 8 in a particular direction and, with the aid of cooperating means, aids in sliding the driven half 8 of the clutch into engagement with the driving half 6. On the other hand, when the output shaft and engaged clutch are turned through action of the motor 1 in the opposite direction, clutch half 8 is caused through suitable cooperating means to slide out of engagement and the torsion spring is caused to rewind.

As to the cooperating means provided to effect engagement of the clutch members when the output shaft is turned in one direction and to effect disengagement of the clutch members when the output shaft is turned in the opposite direction, there is contained in the surface of driven clutch member 8 cam means 24 cooperable with a vertically slidable spring cushioned pin 25 to effect certain directional movements of clutch member 8. The cam means is laid out in plan, and flat as in Fig. 3, to provide a clearer description thereof. It comprises a pair of adjacent tracks 26, 27 of which track 26 is characterized as the high level track, and track 27 as the low level track. Track 26 has a low point or level 28 at one end and a higher level 29 at the other terminal end. Track 27 is immediately adjacent track 26 and also includes a low level 31 at one terminus and a higher level 32 at the other terminus. The low level 31 of track 27 is lower than level 28 of track 26, and the left wall 33 of track 26 tapers to and merges in the end wall 34 at the end of the low level of track 27. At the high level ends of each track, the high level 32 of track 27 is slightly ramped or inclined down toward the high level 29 of track 26; an end wall 35 rises across the ramp formed at terminal ends of the high level of each track. Pin 25 is vertically slidable in a stationary section of the housing. A spring 36 continually urges the lower end of the pin out of the housing into contact with the surface of one or the other of the cam tracks accordingly as one or the other of the tracks is passed beneath the pin. An adjustable screw 38 is provided to adjust the tension of spring 36 against the pin. The tracks do not make a complete revolution about the clutch surface but will terminate short thereof, as understood due to the end island 39.

In describing the operation of the device, let it be assumed that the torsion spring had been allowed to unwind, so that presently the clutch members are engaged with one another. In this position, pin 25 will be positioned in the low level track 27 at the terminal end thereof and limiting against the end and side walls thereof, respectively 34 and 37. Now, energization of the motor 1 will, through the gearing 2, 3, drive the engaged clutch 7 and output shaft 9 in a particular direction, which we will assume to be clockwise. With this action, the cam surface of track 27 passes from the low level thereof to the high level 32 thereof beneath the guide pin 25. During this travel the clutch members remain engaged. The coil spring 19 is ineffective to cause a separation of the clutch members due to pin 25 which limits against the left wall 37 of track 27, and prevents axial movement of the slidable clutch member in a direction to the right. When the high level or ramp end of track 27 passes beneath the guide pin, the latter limits against the terminal wall 35 of the track preventing further rotation of the clutch member and associated output shaft in this direction. Simultaneously with this action, coil spring 19 is free to expand since the pin is now resting upon the ramp end of the tracks, whereupon the slidable clutch member 8 is forced axially to the right out of engagement and the high level terminal end 29 is brought beneath the guide pin. While the output shaft was rotating in a clockwise direction, it caused the torsion spring 22 to be rewound.

The clutch members being disengaged and the torsion spring having been rewound, the output shaft is ready for a return movement or rotation in the opposite direction. The torsion spring now unwinds and drives the output shaft in a counter-clockwise direction which carries clutch member 8 around with it. As the latter turns, the cam surface of track 26 is passed beneath pin 25 from the high surface ramp end of the track to the low end 28 thereof. As the tapered wall end 33 of track 26 moves in contact with the guide pin, the slidable clutch half 8 is cammed leftward to engage clutch half 6. Upon completion of engagement, the terminal end wall 34 which is common to both tracks will limit against the pin as the latter, under tension of its spring 36, drops off the high level track 26 to the low level track 27. The device is now in condition for turning again in a clockwise direction.

This alternate rotation of the output shaft with the engagement and disengagement of the clutch members may be made to continue indefinitely. It is clear, that if the motor is de-energized, the output shaft and clutch will, under action of the torsion spring, come to rest in the engaged position.

This continuous alternate motion of the output shaft may be utilized in controlling the operation of a wide variety of devices, for example, blinker systems, pumps, reciprocating devices, and other devices where a back and forth movement is required.

Means may be employed to hold the clutch or associated output shaft in disengaged position for such time as may be desired. The means provided here for this purpose (Figs. 1, 2) includes a detent wheel 48, pinned to the output shaft, and a solenoid operated pawl 49 adapted to engage a detent 50 of the detent wheel on disengagement of the clutch members. The latter action prevents further return of the output shaft under the action of the torsion spring. The pawl is represented as one arm of a bellcrank lever 51 that is pivoted to a support pin 52. The other arm of the bellcrank lever is linked to a slug 53 of a holding solenoid 55. A spring 56, connected to an ear 57 at the end of bellcrank 51, acts in a direction whereby the pawl is normally held disengaged from the detent wheel. While the pawl is so restrained, the alternate driving of the output shaft in opposite directions continues while the motor is energized. Now, should it be desired to control the action of the output shaft, so that, when it has been turned by the drive shaft and is disengaged from the latter by the clutch member 8, it will be restrained against returning until desired, the holding solenoid 55 is energized. The holding solenoid is energized by closing a switch not shown, whereupon the pawl will be drawn into the detent 50 at the end of a turn of the output shaft. The output shaft will obviously be locked in this position until the holding solenoid is again de-energized.

In this manner the invention may be put to use where it is desired to move an associated device in a particular direction and sometime later restore the moved device to its original position. It is to be appreciated that automatically operated switches may be provided depending on the system with which the device is associated, to automatically control the operations of the holding solenoid.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. An electro mechanical actuator comprising a motor, an output shaft turnable in either direction, a drive shaft powered by the motor, a clutch member for engaging the output shaft with the drive shaft to turn the latter in a particular direction, the clutch member comprising a pair of complementary jaw members engageable and disengageable from one another, one of the jaw members fixed to the drive shaft, the other slidably splined on the output shaft, a coil spring constantly urging the clutch members out of engagement, torsion spring means operable to effect turning of the output shaft in a direction reverse to the particular direction in which it may be turned by the drive shaft, pin means cooperable with cam track means in the slidable clutch member to effect against the bias of the coil spring a sliding of the slidable clutch member into engagement with the other clutch member upon turning of the output shaft by the torsion spring, other cam track means in the slidable clutch member cooperable with the pin means and the coil spring to effect a sliding of the slidable clutch member out of engagement from the other clutch member upon turning of the output shaft by the drive shaft.

2. In a device of the character described, a drive shaft, an output shaft turnable by the drive shaft in one direction and by other means in the opposite direction, a clutch member for engaging and disengaging the drive shaft from the output shaft, the clutch member comprising a pair of complementary jaw members, one fixed to the drive shaft, the other slidably splined to the output shaft, coil spring means between the clutch members urging them apart, and double track cam means in the slidable clutch member, cooperable with a stationary pin to effect engagement of the latter member with the other clutch member against the bias of the coil spring when the output shaft is turned in the opposite direction, and the double track cam means being cooperable with the pin and coil spring to effect the disengagement of the clutch members when the output shaft is turned in one direction.

3. An electro mechanical actuator comprising an output shaft, a drive shaft, a clutch including a pair of jaw members engageable and disengageable for engaging and disengaging the output shaft with the drive shaft, stop means including a radially-extending pin coacting with the output shaft and arranged to limit the output shaft in one direction through an angle of slightly less than one revolution when the output and drive shafts are engaged, return means arranged and operable automatically to return the output shaft in the opposite direction through an angle of slightly less than one revolution when the output and input shafts are disengaged, cam means carried by the output shaft cooperable with said pin and coacting with the return means and jaw members to engage the jaw members at the end of the return movement of the output shaft and further operable upon the rotation of the drive shaft to effect disengagement of the jaw members at the end of the rotation of the output shaft by the drive shaft.

4. An electro mechanical actuator comprising an output shaft, a drive shaft, a clutch including a pair of jaw members engageable and disengageable for engaging and disengaging the output shaft with the drive shaft, stop means including a radially-extending pin coacting with the output shaft and arranged to limit the output shaft in one direction through an angle of slightly less than one revolution when the output and drive shafts are engaged, return means arranged and operable automatically to return the output shaft in the opposite direction through an angle of slightly less than one revolution when the output and input shafts are disengaged, cam means carried by the output shaft cooperable with said pin and coacting with the return means and jaw members to engage the jaw members at the end of the return movement of the output shaft and further operable upon the rotation of the drive shaft to effect disengagement of the jaw members at the end of the rotation of the output shaft by the drive shaft, solenoid operated detent means selectively operable and coacting with the output shaft to disable the operation of the return means.

References Cited in the file of this patent

UNITED STATES PATENTS

| | | |
|---|---|---|
| 1,465,719 | Peters | Aug. 21, 1923 |
| 1,562,730 | Andrews | Nov. 24, 1925 |
| 2,490,044 | Garbarini et al. | Dec. 6, 1949 |